United States Patent
Li et al.

(10) Patent No.: US 10,382,577 B2
(45) Date of Patent: Aug. 13, 2019

(54) TRENDING TOPICS ON A SOCIAL NETWORK BASED ON MEMBER PROFILES

(71) Applicant: Microsoft Technology Licensing, LLC, Redmond, WA (US)

(72) Inventors: Haipeng Li, Mountain View, CA (US); Paul Hyunwoo Ko, San Francisco, CA (US); Ying Liu, Palo Alto, CA (US); Mariah E. Walton, Sunnyvale, CA (US); Valter Ernesto Sciarrillo, San Francisco, CA (US); Ho Joon Park, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 354 days.

(21) Appl. No.: 14/712,213

(22) Filed: May 14, 2015

(65) Prior Publication Data
US 2016/0224675 A1    Aug. 4, 2016

Related U.S. Application Data

(60) Provisional application No. 62/110,325, filed on Jan. 30, 2015.

(51) Int. Cl.
*G06F 17/30* (2006.01)
*H04L 29/08* (2006.01)
*G06Q 50/00* (2012.01)

(52) U.S. Cl.
CPC .......... *H04L 67/306* (2013.01); *G06Q 50/01* (2013.01); *H04L 67/22* (2013.01)

(58) Field of Classification Search
CPC .......... G06F 17/30528; G06F 17/30867; G06F 17/30554; H04L 67/22; H04L 67/1306
See application file for complete search history.

(56) References Cited

U.S. PATENT DOCUMENTS

| | | | | |
|---|---|---|---|---|
| 8,316,056 | B2 * | 11/2012 | Wable ............... | G06F 16/9535 707/791 |
| 8,725,673 | B2 * | 5/2014 | Kast ................... | G06N 5/04 706/47 |
| 8,732,101 | B1 * | 5/2014 | Wilson ............... | G06N 3/063 706/15 |
| 8,929,615 | B2 * | 1/2015 | Garcia ............... | H04N 7/173 382/118 |

(Continued)

*Primary Examiner* — Daniel A Kuddus
(74) *Attorney, Agent, or Firm* — Schwegman Lundberg & Woessner, P.A.

(57) ABSTRACT

A system and method includes an electronic data storage device to store activity data and profile data of members of a social network including content items individually associated with a content item topic. A processor may obtain the activity data and the profile data, determine an association of the social network topic with at least one of a plurality of social network genres based on the activity data, wherein individual ones of the social network genres are based, at least in part, on a category of the profile data. The processor may store the association of the social network topic with the at one of the plurality of social network genres, and cause a user interface to display information related to the content item topic based, at least in part, on the activity data associated with content items associated with the content item type.

20 Claims, 7 Drawing Sheets

(56) References Cited

U.S. PATENT DOCUMENTS

| | | | | |
|---|---|---|---|---|
| 8,935,299 B2* | 1/2015 | Marlow | G06F 16/335 | 707/804 |
| 8,977,611 B2* | 3/2015 | Tseng | G06F 16/955 | 707/728 |
| 9,015,037 B2* | 4/2015 | Myslinski | G06F 17/20 | 704/7 |
| 9,083,767 B2* | 7/2015 | Tseng | H04L 65/40 | |
| 9,213,037 B2* | 12/2015 | Kurono | G01N 35/00613 | |
| 9,213,471 B2* | 12/2015 | Rose | G06F 3/04817 | |
| 9,268,858 B1* | 2/2016 | Yacoub | G06F 16/9535 | |
| 9,542,060 B1* | 1/2017 | Brenner | G06F 9/4451 | |
| 2006/0042483 A1* | 3/2006 | Work | G06Q 10/00 | 101/91 |
| 2008/0077574 A1* | 3/2008 | Gross | G06Q 30/02 | |
| 2008/0201112 A1* | 8/2008 | Bouchard | G06F 17/50 | 703/1 |
| 2008/0301112 A1* | 12/2008 | Wu | G06Q 30/02 | |
| 2010/0121857 A1* | 5/2010 | Elmore | G06F 17/2705 | 707/748 |
| 2011/0055699 A1* | 3/2011 | Li | G06F 16/951 | 715/709 |
| 2011/0179385 A1* | 7/2011 | Li | G06F 16/7867 | 715/810 |
| 2011/0179835 A1* | 7/2011 | Tabe | E05B 79/04 | 70/106 |
| 2013/0066884 A1* | 3/2013 | Kast | G06N 5/04 | 707/748 |
| 2013/0097180 A1* | 4/2013 | Tseng | G06F 16/955 | 707/748 |
| 2014/0214947 A1* | 7/2014 | Jayaram | H04L 67/306 | 709/204 |
| 2014/0236772 A1* | 8/2014 | McCoy | G06Q 30/0635 | 705/26.81 |

* cited by examiner

TRENDING TOPICS ON A SOCIAL NETWORK BASED ON MEMBER PROFILES

PRIORITY

This application claims the benefit of priority to U.S. Provisional Application No. 62/110,325, "TRENDING TOPICS ON A SOCIAL NETWORK BASED ON MEMBER PROFILES", filed Jan. 30, 2015, which is incorporated herein by reference in its entirety.

TECHNICAL FIELD

The subject matter disclosed herein generally relates to determining trending topics in a social network based on the member profile of members that interact with associated content items.

BACKGROUND

Social networks conventionally allow for various users of the social network, including members, sponsoring entities, groups, organizations, and the like, to post content items to the social network. The content items, such as web links, notifications, personal or organizational statements, and the like, may be displayed on the user interfaces of members and other users of the social network according to various criteria. The members of the social network may interact with the content items by, for instance, clicking on a link, "liking" the content item, commenting on the content item, or sharing the content item with other members of the social network, among other potential interactions.

BRIEF DESCRIPTION OF THE DRAWINGS

Some embodiments are illustrated by way of example and not limitation in the figures of the accompanying drawings.

DETAILED DESCRIPTION

Figure 1:
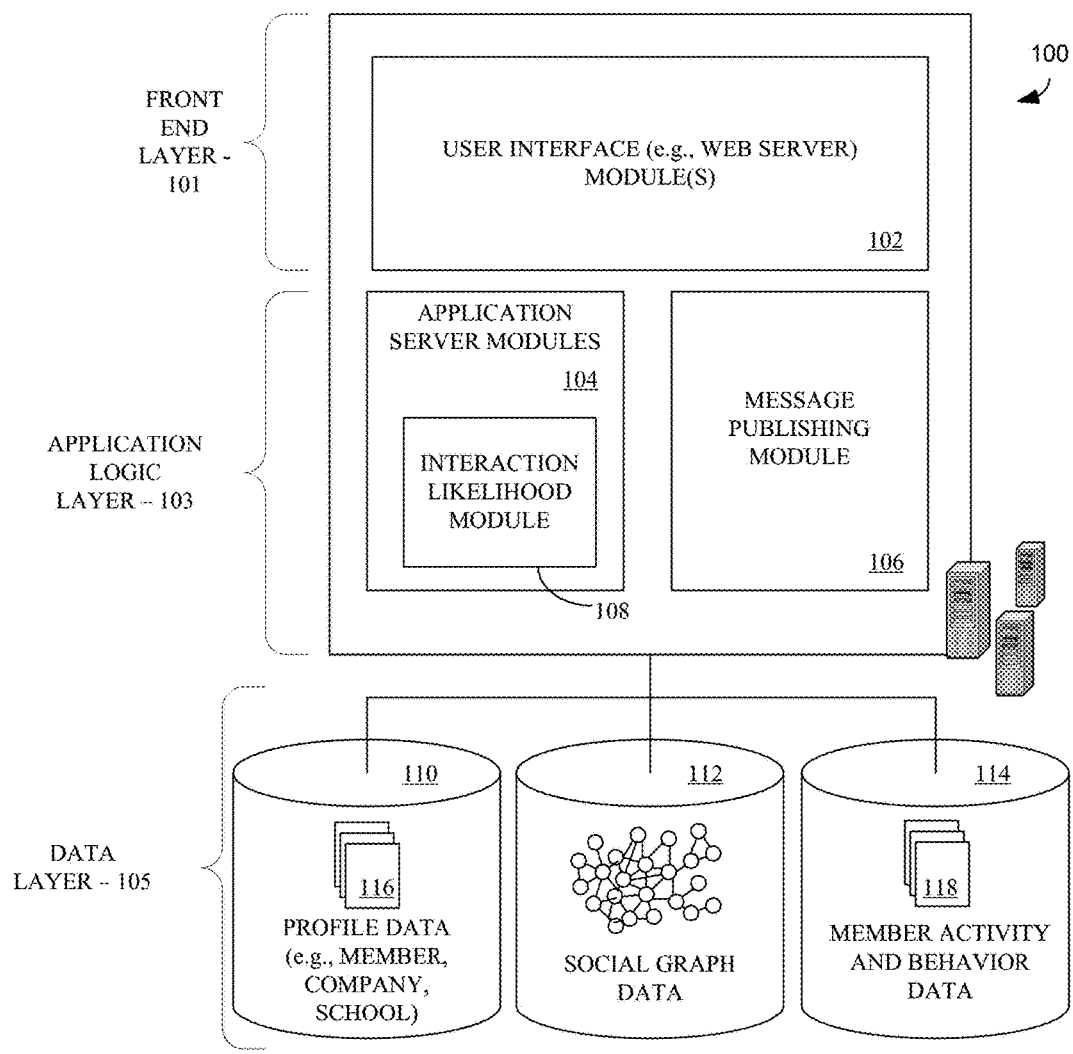
FIG. 1 is a block diagram illustrating various components or functional modules of a social network system, consistent with some examples.

Example methods and systems are directed to determining trending topics in a social network based on the member profile of members that interact with associated content items. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Social network systems can use the concept of "trending" to identify topics that are popular or becoming widely shared or discussed on the social network. For instance, a social network system can identify and track keywords in content items. A keyword may be identified as "trending" if, for instance, the occurrence of the keyword in social network content items increases by a threshold amount. Data on trending content in the social network may be utilized by members to find popular or relevant content, social network administrators to understand how to design the social network to facilitate the distribution of content items, and advertisers to understand what is popular.

However, the identification of such trending concepts may not be sensitive to what members of the social network are causing the content to be trending and what members are actually likely to want to have presented to them. In particular, in the example above, tracking keywords shows what is trending, not what types of members are causing it to be trending. As such, trending data may be relatively inefficient metrics, potentially leading to inefficient use of social network resources, including from the provision of unwanted content items to members and the generation and provision of comparatively inaccurate or unrepresentative data to administrators or advertisers.

A social network system has been developed that utilizes social network profile data of members of the social network to associate trending topics with topic genres in the social network. Topic genres may be based on a category of profile data of the members, such as a career, industry, educational background, location, group affiliation, and so forth. Sub-categories, such as a particular field of engineering or a specific city within a region, may be utilized to create sub-genres with which a topic may be associated.

Activity data may include interactions by members with content items of a topic. Sufficient interactions with the content items of a topic by members that correspond or belong to a profile data category may be utilized in associating the topic with the genre that is associated with the profile data category. Thus, if members whose profile data categorizes them as engineers interact disproportionately with content items of a topic related to computer coding, the computer coding topic may be assigned to an "engineering" genre.

Consequently, trends may be identified not simply on the basis that certain topics are trending, but according to any of a variety of profile data categories. Further, profile data categories may be utilized in identifying topics in the first instance. For instance, the profile data may include sets of skills, hobbies, activities, and the like that the members may engage in. Topics may correspond to those skills and so forth. Thus, in the above example, the "computer coding" topic may be based not necessarily on a keyword but may be predetermined as a topic based on the existence of a computer coding skill. Content items may be assigned to the topics based, for instance, on keywords and interactions with the content items by members who claim the associated skill.

As such, both the generation and organization of topics may be based on data directly pertinent to the profile data of the members. In various circumstances, because the resultant trending data for topics and genres is directly tied to the members who are interacting with the content items and causing the trending in the first instance, the provision of content items and trending data may be more efficient than according to conventional mechanisms, potentially saving social network system resources and providing a better user experience.

FIG. 1 is a block diagram illustrating various components or functional modules of a social network system 100, consistent with some examples. A front end 101 consists of a user interface module (e.g., a web server) 102, which receives requests from various client-computing devices, and communicates appropriate responses to the requesting client devices. For example, the user interface module(s) 102 may receive requests in the form of Hypertext Transport Protocol (HTTP) requests, or other web-based, application programming interface (API) requests. An application logic layer 103 includes various application server modules 104, which, in conjunction with the user interface module(s) 102, may generate various user interfaces (e.g., web pages, applications, etc.) with data retrieved from various data sources in a data layer 105. In some examples, individual application server modules 104 may be used to implement the functionality associated with various services and features of the social network service. For instance, the ability of an organization to establish a presence in the social graph of the social network system 100, including the ability to establish a customized web page on behalf of an organization, and to publish messages or status updates on behalf of an organization, may be services implemented in independent application server modules 104. Similarly, a variety of other applications or services that are made available to members of the social network service may be embodied in their own application server modules 104. Alternatively, various applications may be embodied in a single application server module 104. In some examples, the social network system 100 includes a content item publishing module 106, such as may be utilized to receive content, such as electronic messages, posts, links, images, videos, and the like, and publish the content to the social network.

One or more of the application server modules 104, the content item publishing module 106, or the social network system 100 generally may include a trending content module 108. As will be disclosed in detail herein, the trending content module 108 may associate content item topics with individual ones of multiple social network genres. The trending content module 108 may further associate content items with topics. The trending content module 108 may further identify topics that are trending and generate information related to the trending topic in relation to the genres with which the topic has been associated. The trending content module 108 may utilize member profiles and user activities in the determination of topics, genres, and trending information.

The trending content module 108 may be implemented on a separate server or may be part of a server that provides other portions of the social network system 100. Thus, it is to be understood that while the trending content module 108 is described as an integral component of a social network system 100, the principles described herein may be applied without the trending content module 108 being an integral part of a social network or even necessarily utilizing data from a social network if member profile information and user activities are available from alternative sources.

As illustrated, the data layer 105 includes, but is not necessarily limited to, several databases 110, 112, 114, such as a database 110 for storing profile data 116, including both member profile data as well as profile data for various organizations. Member profile data may include a list of connections each member has with other members of the social network. Consistent with some examples, when a person initially registers to become a member of the social network service, the person may be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 110. Similarly, when a representative of an organization initially registers the organization with the social network service, the representative may be prompted to provide certain information about the organization. This information may be stored, for example, in the database 110, or another database (not shown). With some examples, the profile data may be processed (e.g., in the background or offline) to generate various derived profile data. For example, if a member has provided information about various job titles the member has held with the same or different companies, and for how long, this information can be used to infer or derive a member profile attribute indicating the member's overall seniority level, or seniority level within a particular company. With some examples, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social network service. A "connection" may require a bi-lateral agreement by the members, such that both members acknowledge the establishment of the connection. Similarly, with some examples, a member may elect to "follow" another member. In contrast to establishing a connection, the concept of "following" another member typically is a unilateral operation, and at least with some examples, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph database 112.

Activities by users of the social network system 100 may be logged as activities 118 in the activity and behavior database 114. Such activities 118 may include interactions with content displayed on the social network. Interactions may include clicking on a link to read an article, commenting on a post to the social network, "liking" or otherwise approving of a post, sharing the post, or any of a variety of mechanisms by which a member may engage with social network content. Interactions may further include "passive" interactions, including but not limited to lingering with a content item on the screen, slowing a scrolling speed down as the content item passes over the screen, passing a cursor over the content item, and so forth.

The social network service may provide a broad range of other applications and services that allow members the opportunity to share and receive information, often customized to the interests of the member. For example, with some examples, the social network service may include a photo sharing application that allows members to upload and share photos with other members. With some examples, members may be able to self-organize into groups, or interest groups, organized around a subject matter or topic of interest. With some examples, the social network service may host various job listings providing details of job openings with various organizations, the ranking of schools or other organizations based on educational achievement of the students, job placement, or other factors, and so on.

Although not shown, with some examples, the social network system 100 provides an application programming interface (API) module via which third-party applications can access various services and data provided by the social network service. For example, using an API, a third-party application may provide a user interface and logic that enables an authorized representative of an organization to publish messages from a third-party application to various content streams maintained by the social network service. Such third-party applications may be browser-based applications, or may be operating system-specific. In particular, some third-party applications may reside and execute on one or more mobile devices (e.g., phone, or tablet computing devices) having a mobile operating system.

Figure 2:
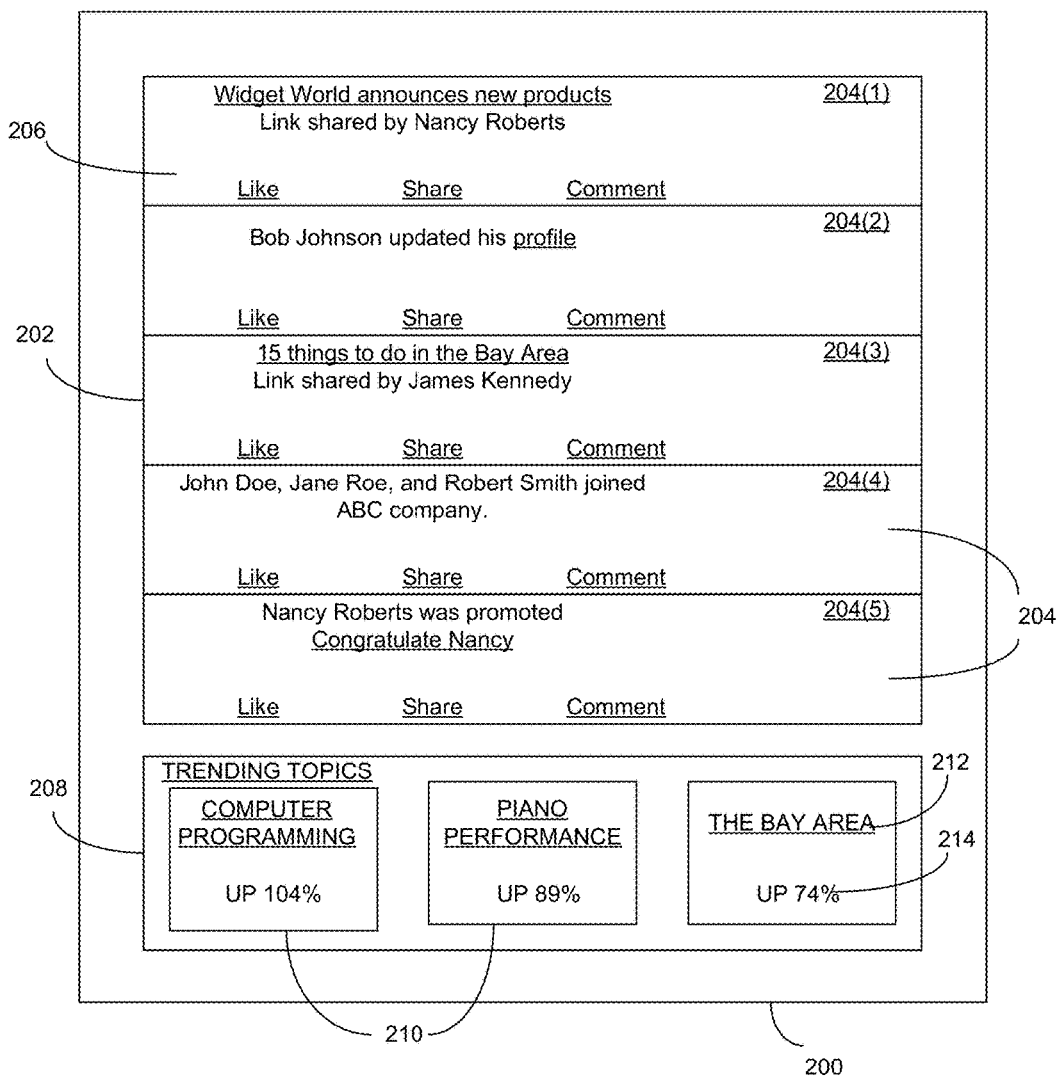
FIG. 2 is a depiction of a user interface as provided by the social network system, in an example embodiment.

FIG. 2 is a depiction of a user interface 200 as provided by the social network system 100, in an example embodiment. The user interface 200 includes a news feed 202 that includes multiple individual positions 204 arranged, in this example, in a vertical list with a first position 204(1) at the top and lower positions sequentially down the list. Each position 204 includes space to display content related to the content item 206; in various examples, the content item 206 itself may be displayed, for instance if the content item 206 is a link or a renderable image, or data relating to the content item 206 may be displayed, such as if the content item 206 needs to be reformatted for the user interface 200 or the circumstances in which the user interface 200 is being displayed. The positions further include links to interact with the content item, including a link to "like" the content item 206, share the content item on the social network 200, and comment on the content item 206. Interactions may be stored in the activity database 114 as activities 118.

The user interface 200 further includes a trending topics window 208. The trending topics window 208 includes one or more topics 210. As illustrated, each topic 210 includes a title 212 that may double as a link, such as to a window or command to display content items 206 related to the topic 210. The topic 210 further includes a statistic or other information 214 related to the topic 210. As illustrated, the information 214 is a degree to which the topic has increased over a predetermined time period, though it is to be understood that any of a variety of statistics or information may be displayed.

The user interface 200, generally, and the news feed 202 and the trending topics window 208, specifically, are presented for the purposes of an example illustration and is not limiting. It is to be recognized that additional components or items may be included in the user interface 200 and that the components illustrated may be presented in different configurations than those illustrated here. For instance, the trending topics window 208 may include recommendations for single content items 206. For instance, a recommendation may be for a content item 206 that is related to the member associated with the user interface 200 but a topic with which the content item 206 is associated may not be related to the user. As a further example, topics 210 and/or content items 206 may be displayed that are related to the member's connections in the social network or to the social network as a whole rather than to the member personally. Thus, a topic 210 or content item 206 may be posted with a note that it is relevant to the member's connections on the social network. These examples are non-limiting and other content may be included in the user interface 200 as desired.

Figure 3:
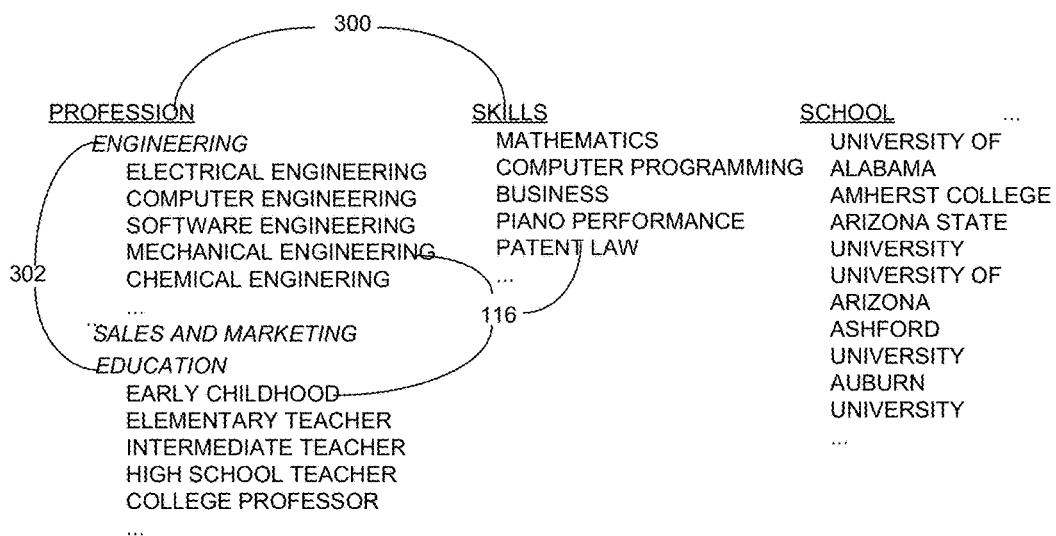
FIG. 3 is an abstract illustration of categories of social network profile data, in an example embodiment.

FIG. 3 is an abstract illustration of categories 300 of social network profile data 116, in an example embodiment. The categories 300 include profession, employer, employer's industry or industrial sector, school, location, professional skills, and so forth. Such categories 300 are presented without limitation and it is to be recognized that profile data 116 may be categorized in any of a variety of ways. For instance, while a social network that is centered around professional networking may include the categories 300 listed above, a social network that is centered around connecting friends and family may utilize different categories.

Certain categories 300 include individual profile data 116. Thus, for instance, profile data 116 that includes a school from which the member graduated is, in the illustrated example, directly associated with the school category 300. By contrast, certain categories 300 may include sub-categories 302. For instance, in the profession category 300, sub-categories 302 may include engineering, sales, accounting, and so forth, while the "engineering" sub-category 302 includes individual profile data 116 of "software engineer", "electrical engineer", "mechanical engineer", and so forth.

Figure 4A:
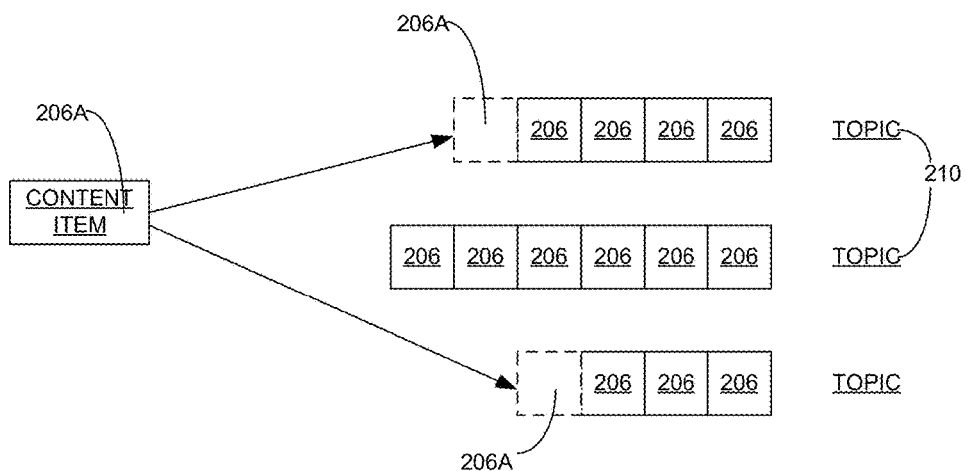
FIGS. 4A and 4B are an abstract illustration of the organization of content items into topics and topics into genres, respectively, in an example embodiment.
Figure 4B:
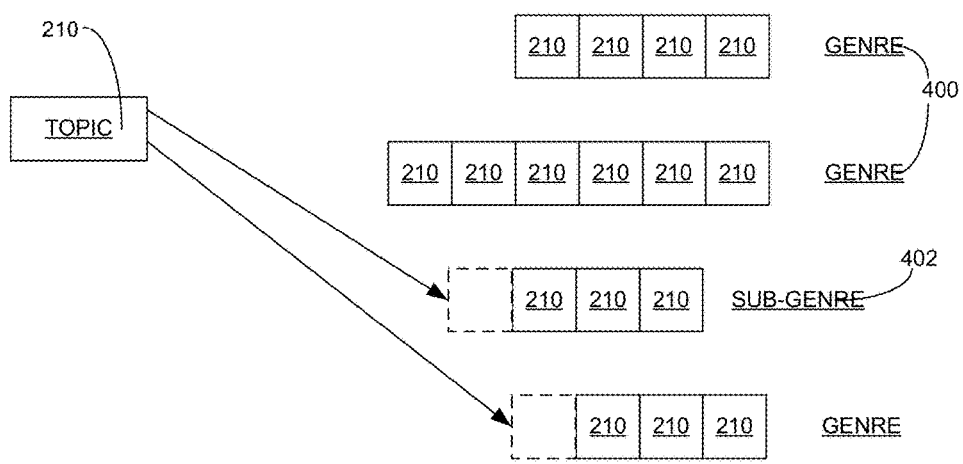

FIGS. 4A and 4B are an abstract illustration of the organization of content items 206 into topics 210 and topics into genres 400, respectively, in an example embodiment. The content items 206 are stored in any of a variety of databases of the social network system 100 and may include registers or other electronic data storage mechanisms for denoting one or more topics 210 with which the content item 206 has been associated. For the purposes of illustration, the content items 206 are depicted as being physically moved to be part of a topic 210. It is to be understood, however, that content items 206 as physically stored in an electronic data storage and/or database are not necessarily physically moved as part of being associated with a topic 210.

In FIG. 4A, topics 210 are created or maintained on the basis of a first category 300 of profile data 116. In an example, the first category 300 of the profile data 116 is "professional skills" of members of the social network, though it is to be recognized that any of a variety of categories 300 of profile data 116 may be utilized to generate the topics 210. Thus, in the illustrated example, some or all of the profile data 116 in the "skills" category 300 as illustrated in FIG. 3 is are utilized to create or maintain an associated topic 210 as illustrated in FIG. 4.

With respect to the "skills" category 300 and related profile data 116 in particular, a skill profile data 116 may reflect the member's assessment of the member's own talents, experiences, abilities, and so forth or that of the member's connections in the social network. Thus, to obtain a skill profile data 116, the member or a member's connection may assert that the member has a particular skill, in which case the member's profile data 116 is updated to reflect that particular skill. In an example, each skill profile data 116 may correspond to a topic 210, though not necessarily all of the skills profile data 116 are turned into a topic 210.

A content item 206A may be associated with a topic 210 based on a relationship of the content item 206A to the topic 210. Various examples, the trending content module 108 utilizes any of a variety of mechanisms to associate a content item 206A with a topic 210. In an example, the trending content module 108 utilizes a keyword search of a content item 206A and, based on keywords related to a given topic 210, may associate the content item 206A with the topic 210. In such an example, keywords may be derived from the title of the topic 210, common words of content items 206 already associated with the topic, human input, and so forth.

Additionally or alternatively, the trending content module 108 may utilize activity data 118 to associate content items 206 with a topic 210. For instance, when a certain number of members who have the profile data 116 associated with a topic 210 interact with a content item 206, the content item 206 may be associated with the topic 210. By way of example, if a predetermined percentage (e.g., one percent to ten percent) or a predetermined number (that may be dependent on the size of the social network) of members of the social network who have the skill "circuit design" interact with a particular content item 206 by clicking a link, sharing, commenting, and/or "liking" the content item 206, the content item 206 may be inferred to be related to a "circuit design" topic 210 and thus associated with the "circuit design" topic.

The association of a content item 206 to one topic 210 does not necessarily preclude the association of the same content item 206 with one or more additional topics 210. Thus, for instance, if a predetermined percentage of members with the skill "electrical engineering" have also interacted with the content item 206 then the content item 206 may also be associated with the "electrical engineering" topic 210.

The trending content module 108 may utilize multiple factors described herein to associate content items 206 with appropriate topics 210. Thus, in an example, the trending content module 108 may utilize a keyword analysis of a content item 206 to identify topic 210 with which the content item 206 may provisionally be associated but utilize the profile data 116 of members to confirm or otherwise ratify the provisional association, or vice versa. Additionally or alternatively, if either a keyword analysis or a profile data 116 analysis by the trending content module 108 suggests the content item 206 should be associated with a topic 210 then the content item 206 may be associated with the topic 210.

It is noted and emphasized that multiple mechanism for creating topics 210 may be implemented in addition to or instead of that described above. The use of a profile data category 300 such as skills may be supplemented or replaced altogether with other mechanisms, including profile data from multiple categories (e.g., member interests, locations, schools, etc.), user selection of topics 210, and keyword searches of content items 206 to identify topics 210. The keyword searches of content items 206 may favor content items 206 with the most interactions (e.g., create or maintain topics 210 based on the top five or ten interacted-with content items 206). Thus, topics 210 may incorporate current events, people, and the like, in addition to or instead of a single profile data category 300.

With respect to FIG. 4B, the topics 210 may be organized into or associated with genres 400 by utilizing a second category of profile data 116 different from the first category of profile data 116 utilized to associate content items 206 with topics 210. In an example, the profile data 116 category is a profession or industry, though any of a variety of profile data 116 categories may be utilized as appropriate to the circumstances of the social network.

For some or all of the topics 210, the trending content module 108 may cross-reference activities 118 with associated content items 206 against the profile data 116 of members of the social network. As with the association of content items 206 to topics 210, if sufficient members who have profile data 116 associated with a genre 400 have interacted with content items 206 associated with a given topic 210, the topic 210 may be associated with the genre 400. Further as with topics 210, a single topic 210 may be associated with multiple genres 400.

Certain genres 400 include sub-genres 402. The sub-genres 402 may correspond to sub-categories in the profile data 116 category related to the genre 400. Thus, for instance, a profile data 116 category may be "engineering" and sub-categories may be particular disciplines of engineering, such as "electrical engineering", "computer engineering", "software engineering", "mechanical engineering", "chemical engineering", and so forth. Consequently, a genre 400 may be "engineering" with the sub-genres 402 corresponding to the engineering sub-categories. Although not specifically illustrated, it will be appreciated that the genres 400 may be organized hierarchically, with the sub-genres 402 having sub-sub-genres and down as many hierarchical levels as may be supported by the profile data 116 categories, sub-categories, and so forth.

Figure 5:
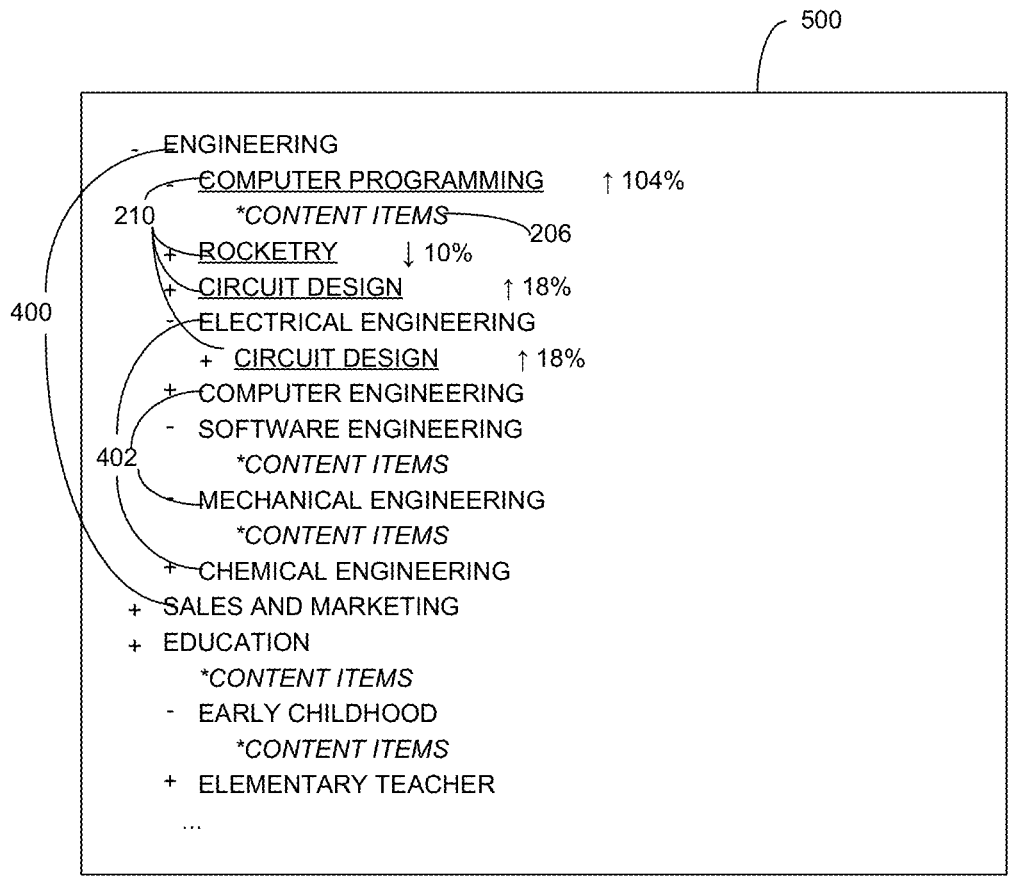
FIG. 5 is a user interface for displaying trending information for genres, in an example embodiment.

FIG. 5 is a user interface 500 for displaying trending information for genres 400, in an example embodiment. The user interface 500 may be displayed on the same user device as the user interface 200. In an example, the user interface 500 may be navigated to using web links and the like from the user interface 200, or may be a separate site or application from the user interface 200.

The user interface 500 provides for the hierarchical display of trend information according to genres 400. A user may expand and contract genres 400, sub-genres 402 (herein after collectively referred to as a "genre 400"), and so forth to display topics 210 that have been associated with genre 400. As with the topics 210 as displayed on the user interface 200, the topics 210 include a title 212 that may double as a link as well as information 214 (as illustrated in FIG. 2) indicative of the trending of the topic 210.

The trending window 208 may display trending topics 210 of interest to the member to whom the user interface 200 is being displayed. A topic 210 may be of interest to the member if the topic 210 corresponds to a profile data 116 of the member, e.g., if the topic 210 is based on a skill profile data 116 that the member possesses or if the topic 210 has been previously engaged with by the member (e.g., the member previously liked, commented, or otherwise interacted with a content item 206 associated with the topic 210). The trending window 208 also, in certain examples, only displays a relatively limited number of topics 210.

By contrast, the user interface 500 may provide for the hierarchical display of all of the topics 210 that have been associated with a genre 400. Topics 210 that have been associated with multiple genres 400 may be display hierarchically with respect to each of those genres 400. Thus, a single topic 210 may be displayed multiple times on the user interface 500. A user may select a topic 210 to see content item 206 that have been associated with the topic 210.

Note that the hierarchical display may place certain elements on the same hierarchical level. Thus, for a given genre 400 (e.g., "ENGINEERING"), both topics 210 that are associated directly with the genre 400 (e.g., "COMPUTER PROGRAMMING", "ROCKETRY", etc.) and sub-genres 402 of the genre 400 (e.g., "ELECTRICAL ENGINEER- ING", "COMPUTER ENGINEERING", etc.) would appear on the same hierarchical level.

Further in contrast to the illustrated example tending topics window 208, the user interface 500 may display any or all topics 210 that are associated with each genre 400. Thus, as a user steps through the hierarchy of genres 400, the user may see any or all of the topics 210 that are associated with the genre. By contrast, the illustrated example of the trending topics window 208 shows only a few trending topics 210 and not necessarily with respect to an associated genre 400. While the topics 210 may be pertinent to the member associated with the user interface 200 based on the member's profile data (e.g., displaying topics 210 that are associated with a skill or a profession profile data 116 of the user), the display of topics 210 may be abbreviated for simplicity on the user interface 200.

In further contrast to the topics window 208 of the illustrated example, the user interface 500 may display topics 210 regardless of if the topics are on an increasing trend or a decreasing trend. In the illustrated example of the topics window 208, the fastest-increasing topics 210 are displayed rather than all of the topics 210 and are displayed without respect to genres 400. Thus, the user interface 500 may provide more comprehensive information than the trending topics window 208 while the trending topics window 208 may serve to particularly emphasize trending topics at the expense of a complete rundown of all of the topics.

While the user interface 500 is characterized as displaying or making accessible all of the topics 210 it is to be recognized that various particular implementations of the user interface 500 may not necessarily provide all of the topics 210. As noted here, in various examples only those topics 210 that have been associated with a genre 400 may be displayed. Further, topics 210 that have fewer associated content items 206 than a predetermined threshold, either in percentage terms or an absolute number of content items 206, may also optionally be omitted. Topics 210 may further be omitted based on social network administrator or government policies. In an example, the user interface 500 has controls that allow a user to configure what topics 210 are displayed based, at least in part, on the factors disclosed herein.

Flowchart

Figure 6:
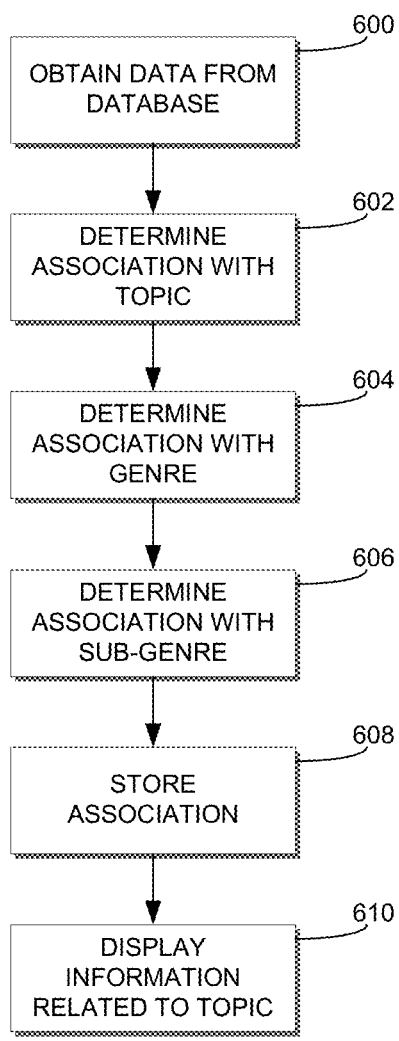
FIG. 6 is a flow chart for trending topics on a social network based on member profiles, in an example embodiment.

FIG. 6 is a flowchart for trending topics on a social network based on member profiles, in an example embodiment. The operations of the flowchart may be implemented on the social network system 100 or any suitable equipment or system.

At operation 600, activity data of members of a social network and profile data of the members of the social network are obtained with a processor from a database, wherein the social network includes a plurality of content items, individual ones of the plurality of content items being associated with a content item topic. In an example, the content item topic is based, at least in part, on a first category of the profile data. In an example, the activity data includes activities by the members with the content items associated with the topic. In an example, the activities include interactions with the content items. In an example, the first category is a social network skill.

At operation 602, an association of the one of the content items with the topic is determined with the processor based, at least in part, on the activities with the one of the content items by members who have the individual profile data point that corresponds to the topic. In an example, the activities include interactions with the one of the content items. In an example, determining the association of the one of the content items with the topic is based, at least in part, on a number of the interactions with the one of the content items by the members having the one of the individual profile data points of the first category, the number of interactions being greater than a predetermined threshold.

At operation 604, an association of the social network topic with at least one of a plurality of social network genres is determined with the processor based, at least in part, on the activity data, wherein individual ones of the social network genres are based, at least in part, on a category of the profile data. In an example, the category is one of a profession and an industry associated with the member. In an example, the individual ones of the social network genres are based, at least in part, on a second category of the profile data, wherein the first category and the second category of the profile data each include individual profile data points. In an example, the topic corresponds to one of the individual profile data points of the first category and the plurality of genres individually correspond to ones of the individual profile data points of the second category. In an example, the members individually include one of the individual profile data points of the second category. In an example, determining the association of the topic is based, at least in part, on activities by the members having one of the individual profile data points of the second category that correspond to the at least one of the plurality of social network genres.

At operation 606, an association of the topic with a sub-genre of the genre is determined with the processor based, at least in part, on the activity data, wherein storing the association with the sub-genre in the data structure. In an example, the sub-genre is based on a sub-category of the category of the profile data.

At operation 608, the association of the social network topic with the at least one of the plurality of social network genres is stored in a data structure of an electronic data storage device.

At operation 610, a user interface is caused, with the processor, to display information related to the content item topic based, at least in part, on the activity data associated with content items associated with the content item type and the genre. In an example, the user interface is further caused to display information related to the content item topic based on the sub-genre.

System

Figure 7:
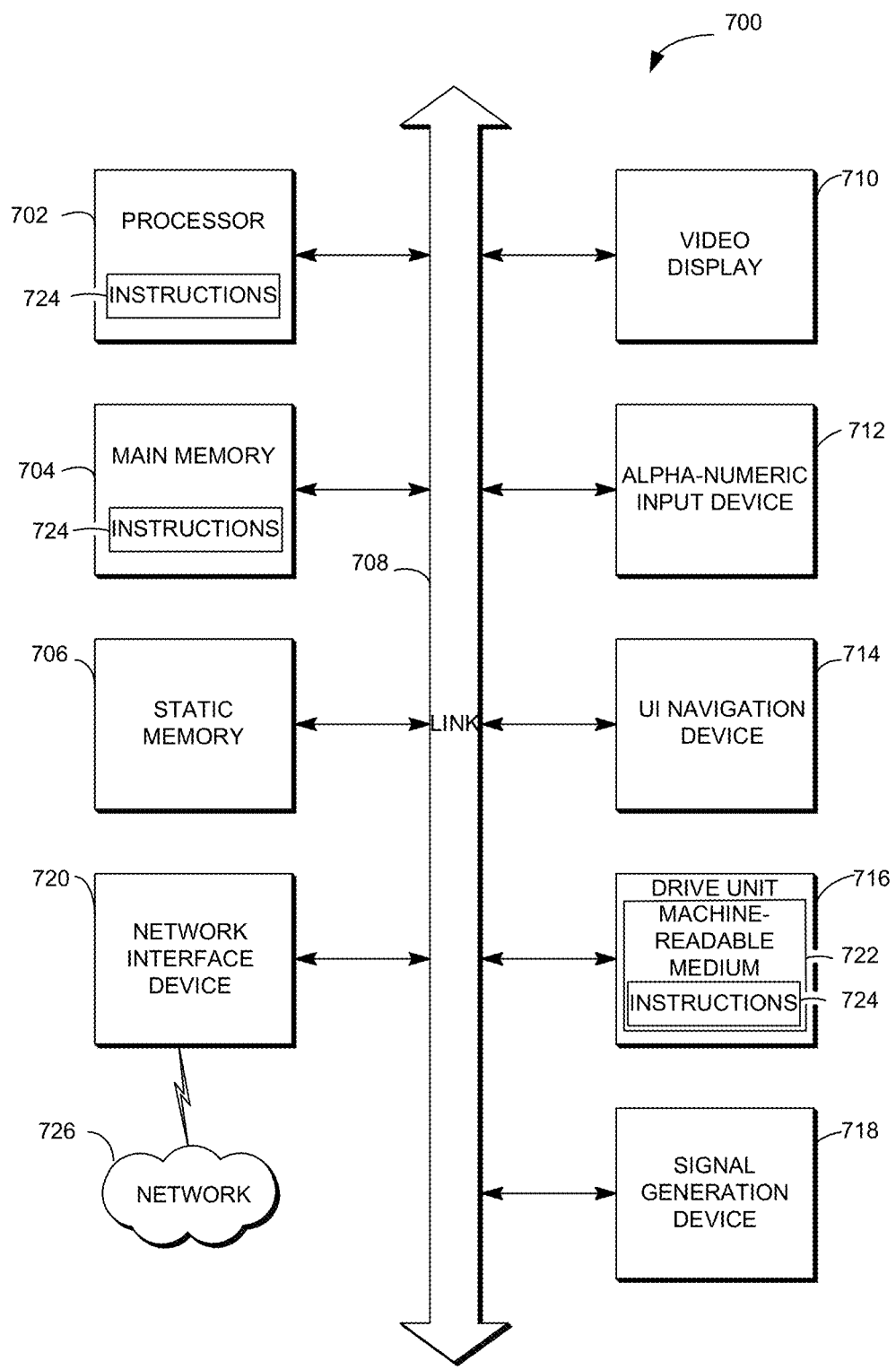
FIG. 7 is a block diagram illustrating components of a machine, according to some example embodiments.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, the machine 700 may implement the social network system 100 and the features included and described therein. The machine 700 thus describes specific hardware configurations on which the social network system 100 may be implemented and provided to users of the social network system 100.

FIG. 7 shows a diagrammatic representation of the machine 700 in the example form of a computer system and within which instructions 724 (e.g., software) for causing the machine 700 to perform any one or more of the methodologies discussed herein may be executed. In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The machine 700 may further include a graphics display 710 (e.g., a plasma display panel (PDP), a light emitting diode (LED) display, a liquid crystal display (LCD), a projector, or a cathode ray tube (CRT)). The machine 700 may also include an alphanumeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a speaker), and a network interface device 720.

The storage unit 716 includes a machine-readable medium 722 on which is stored the instructions 724 (e.g., software) embodying any one or more of the methodologies or functions described herein. The instructions 724 may also reside, completely or at least partially, within the main memory 704, within the processor 702 (e.g., within the processor's cache memory), or both, during execution thereof by the machine 700. Accordingly, the main memory 704 and the processor 702 may be considered as machine-readable media. The instructions 724 may be transmitted or received over a network 726 via the network interface device 720.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 700), such that the instructions, when executed by one or more processors of the machine (e.g., processor 702), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method, comprising:

obtaining, with a processor, from a database, activity data of members of a social network and profile data of the members of the social network, wherein the social network includes a plurality of content items, the activity data indicative of interactions by the members with the plurality of content items, individual ones of the plurality of content items being associated with a content item topic;

determining, with a processor, an association of the content item topic with at least one of a plurality of social network genres based on the activity data for a predetermined number of members of the social network indicating an interaction with at least one of the plurality of content items associated with the content item topic, wherein the tending content is cross-references the activity data with associated content items against the profile data of members of the social network, wherein individual ones of the social network genres are based on a category of the profile data, wherein the association of individual ones of the plurality of content items with the content item topic is based on members who have profile data associated with the genre who have interacted with at least one content item associated with the content item topic, the content item topic being associated with the genre;

storing, in a data structure of an electronic data storage device, the association of the content item topic with the at least one of the plurality of social network genres, wherein at least one content item topic is associated with more than one of the plurality of social network genres;

determining, with the processor, the content item topic is trending based on an increase in a number of the interactions of the activity data with content items associated with the content item topic over time and an increase in a number of interactions of the activity data with content items associated with the genre with which the content item topic has been associated over time; and causing, with the processor, a user interface to display information related to the content item topic based on the content item topic having been identified as being trending.

2. The method of claim 1, wherein the content item topic is based on a first category of the profile data, wherein the individual ones of the social network genres are based on a second category of the profile data, wherein the first category and the second category of the profile data each include individual profile data points, wherein the topic corresponds to one of the individual profile data points of the first category and the plurality of genres individually correspond to ones of the individual profile data points of the second category.

3. The method of claim 2, wherein the activity data includes activities by the members with the content items associated with the topic, wherein the members individually include one of the individual profile data points of the second category, and wherein determining the association of the topic is based on activities by the members having one of the individual profile data points of the second category that correspond to the at least one of the plurality of social network genres.

4. The method of claim 3, wherein determining the association of the topic is based on a number of the interactions with the content items associated with the topic by the members having the one of the individual profile data points of the second category, the number of interactions being greater than a predetermined threshold.

5. The method of claim 2, wherein the activity data includes interactions by the members with one of the content items, and further comprising:
determining, with the processor, an association of the one of the content items with the topic based on the interactions with the one of the content by members who have the individual profile data point that corresponds to the topic.

6. The method of claim 5, wherein determining the association of the one of the content items with the topic is based on a number of the interactions with the one of the content items by the members having the one of the individual profile data points of the first category, the number of interactions being greater than a predetermined threshold.

7. The method of claim 2, wherein the first category is a social network skill.

8. A system, comprising:
an electronic data storage device configured to store activity data and profile data of members of a social network wherein the social network includes a plurality of content items, the activity data indicative of interactions by the members with the plurality of content items, individual ones of the plurality of content items being associated with a content item topic;
a hardware processor, configured to:
obtain the activity data and the profile data from the electronic data storage device;
determine an association of the content item topic with at least one of a plurality of social network genres based on the activity data for a predetermined number of members of the social network indicating an interaction with at least one of the plurality of content items associated with the content item topic, wherein the tending content is cross-references the activity data with associated content items against the profile data of members of the social network, wherein individual ones of the social network genres are based on a category of the profile data, wherein the association of individual ones of the plurality of content items with the content item topic is based on members who have profile data associated with the genre who have interacted with at least one content item associated with the content item topic, the content item topic being associated with the genre;
store, in a data structure of the electronic data storage device, the association of the content item topic with the at least one of the plurality of social network genres, wherein at least one content item topic is associated with more than one of the plurality of social network genres;
determine the content item topic is trending based on an increase in a number of the interactions of the activity data with content items associated with the content item topic over time and an increase in a number of interactions of the activity data with content items associated with the genre with which the content item topic has been associated over time; and
cause a user interface to display information related to the content item topic based on the content item topic having been identified as being trending.

9. The system of claim 8, wherein the content item topic is based on a first category of the profile data, wherein the individual ones of the social network genres are based on a second category of the profile data, wherein the first category and the second category of the profile data each include individual profile data points, wherein the topic corresponds to one of the individual profile data points of the first category and the plurality of genres individually correspond to ones of the individual profile data points of the second category.

10. The system of claim 9, wherein the activity data includes activities by the members with the content items associated with the topic, wherein the members individually include one of the individual profile data points of the second category, and wherein the processor is configured to determine the association of the topic based on activities by the members having one of the individual profile data points of the second category that correspond to the at least one of the plurality of social network genres.

11. The system of claim 10, wherein the processor is configured to determine the association of the topic based on a number of the interactions with the content items associated with the topic by the members having the one of the individual profile data points of the second category, the number of interactions being greater than a predetermined threshold.

12. The system of claim 9, wherein the activity data includes interactions by the members with one of the content items, and wherein the processor is further configured to determine an association of the one of the content items with the topic based on the interactions with the one of the content by members who have the individual profile data point that corresponds to the topic.

13. The system of claim 12, wherein the processor is further configured to determine the association of the one of the content items with the topic based on a number of the interactions with the one of the content items by the members having the one of the individual profile data points of the first category, the number of interactions being greater than a predetermined threshold.

14. The system of claim 9, wherein the first category is a social network skill.

15. A non-transitory computer readable medium, comprising instructions which, when implemented by a processor, cause the processor to perform operations comprising:
obtain, from a database, activity data of members of a social network and profile data of the members of the social network, wherein the social network includes a plurality of content items, the activity data indicative of interactions by the members with the plurality of content items, individual ones of the plurality of content items being associated with a content item topic;
determine an association of the content item topic with at least one of a plurality of social network genres based on the activity data, for a predetermined number of members of the social network indicating an interaction with at least one of the plurality of content items associated with the content item topic, wherein the tending content is cross-references the activity data with associated content items against the profile data of members of the social network, wherein individual ones of the social network genres are based on a category of the profile data, wherein the association of individual ones of the plurality of content items with the content item topic is based on members who have profile data associated with the genre who have interacted with at least one content item associated with the content item topic, the content item topic being associated with the genre;

store, in a data structure of an electronic data storage device, the association of the content item topic with the at least one of the plurality of social network genres, wherein at least one content item topic is associated with more than one of the plurality of social network genres;

determining the content item topic is trending based on an increase in a number of the interactions of the activity data with content items associated with the content item topic over time and an increase in a number of interactions of the activity data with content items associated with the genre with which the content item topic has been associated over time; and cause a user interface to display information related to the content item topic based on the content item topic having been identified as being trending.

16. The computer readable medium of claim 15, wherein the content item topic is based on a first category of the profile data, wherein the individual ones of the social network genres are based on a second category of the profile data, wherein the first category and the second category of the profile data each include individual profile data points, wherein the topic corresponds to one of the individual profile data points of the first category and the plurality of genres individually correspond to ones of the individual profile data points of the second category.

17. The computer readable medium of claim 16, wherein the activity data includes activities by the members with the content items associated with the topic, wherein the members individually include one of the individual profile data points of the second category, and wherein determining the association of the topic is based on activities by the members having one of the individual profile data points of the second category that correspond to the at least one of the plurality of social network genres.

18. The computer readable medium of claim 16, wherein the activity data includes interactions by the members with one of the content items, and wherein the instructions further cause the processor to perform operations comprising:

determine an association of the one of the content items with the topic based on the interactions with the one of the content by members who have the individual profile data point that corresponds to the topic.

19. The computer readable medium of claim 17, wherein determining the association of the topic is based on a number of the interactions with the content items associated with the topic by the members having the one of the individual profile data points of the second category, the number of interactions being greater than a predetermined threshold.

20. The computer readable medium of claim 18, wherein determining the association of the one of the content items with the topic is based on a number of the interactions with the one of the content items by the members having the one of the individual profile data points of the first category, the number of interactions being greater than a predetermined threshold.

* * * * *